United States Patent
Becker et al.

(10) Patent No.: US 6,235,983 B1
(45) Date of Patent: May 22, 2001

(54) HYBRID POWER ASSEMBLY

(75) Inventors: Frederick E. Becker, Reading; Kailash C. Shukla, Boxborough; Edward F. Doyle, Dedham; Maurice Nunes, Arlington, all of MA (US)

(73) Assignee: Thermo Power Corporation, Waltham, MA (US)

(*) Notice: Subject to any disclaimer, the term of this patent is extended or adjusted under 35 U.S.C. 154(b) by 0 days.

(21) Appl. No.: 09/416,334

(22) Filed: Oct. 12, 1999

(51) Int. Cl.[7] .................. H01L 31/058; H01L 31/101
(52) U.S. Cl. .................. 136/253; 136/248; 136/293; 429/111
(58) Field of Search .................. 136/253, 248, 136/293; 429/111

(56) References Cited

U.S. PATENT DOCUMENTS

| | | | | |
|---|---|---|---|---|
| 4,707,560 | * | 11/1987 | Hottel et al. | 136/253 |
| 4,906,178 | * | 3/1990 | Goldstein et al. | 431/79 |
| 5,932,885 | * | 8/1999 | DeBellis et al. | 250/493.1 |
| 5,942,047 | * | 8/1999 | Fraas et al. | 136/253 |
| 6,092,912 | * | 7/2000 | Nelson | 136/253 |

* cited by examiner

*Primary Examiner*—Alan Diamond
(74) *Attorney, Agent, or Firm*—Pandiscio & Pandiscio (57) ABSTRACT

A hybrid power assembly includes a thermophotovoltaic (TPV) power conversion module for converting radiant thermal energy into electrical power, and a battery in electrical communication with the TPV power source and rechargeable by electrical power generated by the TPV power source.

42 Claims, 8 Drawing Sheets

HYBRID POWER ASSEMBLY

The invention described herein was made in performance of work under a NASA contract and is subject to the provisions of Sec. 305 of the National Aeronautic and Space Act of 1958. Public Law 85558 (72 Stat. 435) 42 U.S.C. 2457.

BACKGROUND OF THE INVENTION

1. Field of the Invention

This invention relates to power generation and storage devices and is directed more particularly to a hybrid power assembly including a thermophotovoltaic power conversion module in combination with a battery rechargeable by the module.

2. Description of the Prior Art

The U.S. Army purchases large quantities of batteries to meet the needs of the dismounted soldier for both military missions and for training for such missions. For actual missions, the lower weight and higher stored energy of non-rechargeable batteries make them a clear choice. For training, rechargeable batteries are used more often because they can be recharged hundreds of times, thereby making their life-cycle costs much lower than that of non-rechargeable batteries. The higher weight and lower stored energy of rechargeable batteries, compared to non-rechargeable batteries, requires more rechargeable batteries and a correspondingly higher weight for the soldier to carry in training for a mission, than for the actual mission. The time required to recharge batteries is also problematic in a military environment.

A non-rechargeable battery used in large quantities by the Army is referred to as the BA-5590. This is a lithium-sulfur dioxide battery with a nominal output of 12 or 24 volts with a current flow capability of 4 or 2 amps, respectively, for approximately 3.4 hours. This represents a capacity of approximately 163 watt-hours. The overall battery dimensions are 4.4 inches wide, by 2.45 inches deep, by 5.0 inches high. This battery and its rechargeable alternative, the BB-390A/U, are useable in many military platforms, and represent a significant fraction of the cost of batteries purchased by the Army.

The performance characteristics of the batteries are presented below. While the batteries are identical in size and configuration, the weight of the rechargeable BB-390A/U battery is 65% higher than that of the non-rechargeable BA-5590 battery. The capacity of the rechargeable BB-390A/U is only 47% of the BA-5590 battery. It is because of such advantages, that non-rechargeable batteries usually are preferred for military missions.

| Specifications | BA-5590 Battery Non-Rechargeable | BB-390 A/U Battery Rechargeable |
|---|---|---|
| Dimensions (l × w × h), in | 4.4 × 2.45 × 5.0 | Same |
| Volume, in$^3$ | 53.9 | Same |
| Weight, lb | 2.33 | 3.85 |
| Max. Current, amps | 4/2 | 7.2/3.6 |
| Nominal Voltage, volts | 12/24 | Same |
| Max. Power, watts | 48 | 86 |
| Storage Capacity, w-h | 163 | 77 |

It is desired to provide a power source for the foot soldier which provides higher stored energy then electrochemical batteries, provides for greatly shortened recharging times, provides high instantaneous power, and is smaller in size and weight than the customarily used quantities of BA-5590 and BB-390A/U batteries. It is further desired that the power source be useable after being submerged in water, when disposed in any orientation, and when subjected to atmospheres having contaminants therein.

SUMMARY OF THE INVENTION

It is therefore, an object of the invention to provide a power source which may be substituted for a plurality of the aforesaid batteries and which provides high stored energy, provides for essentially instant recharging, and provides high instantaneous power.

A further object of the invention is to provide such a power source as is small in size and weight.

A further object of the invention is to provide such a power source which is useable after being submerged, when disposed in any orientation, and when subjected to atmospheric contaminants.

With the above and other objects in view, as will hereinafter appear, a feature of the present invention is the provision of a hybrid power assembly comprising a thermophotvoltaic (TPV) power conversion module for converting radiant thermal energy to electrical energy, and a battery in electrical communication with the TPV power module and rechargeable by electrical power generated by the TPV power module.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodied the invention, from which its novel features and advantages will be apparent.

In the drawings.

DESCRIPTION OF THE PREFERRED EMBODIMENTS

Figure 1:
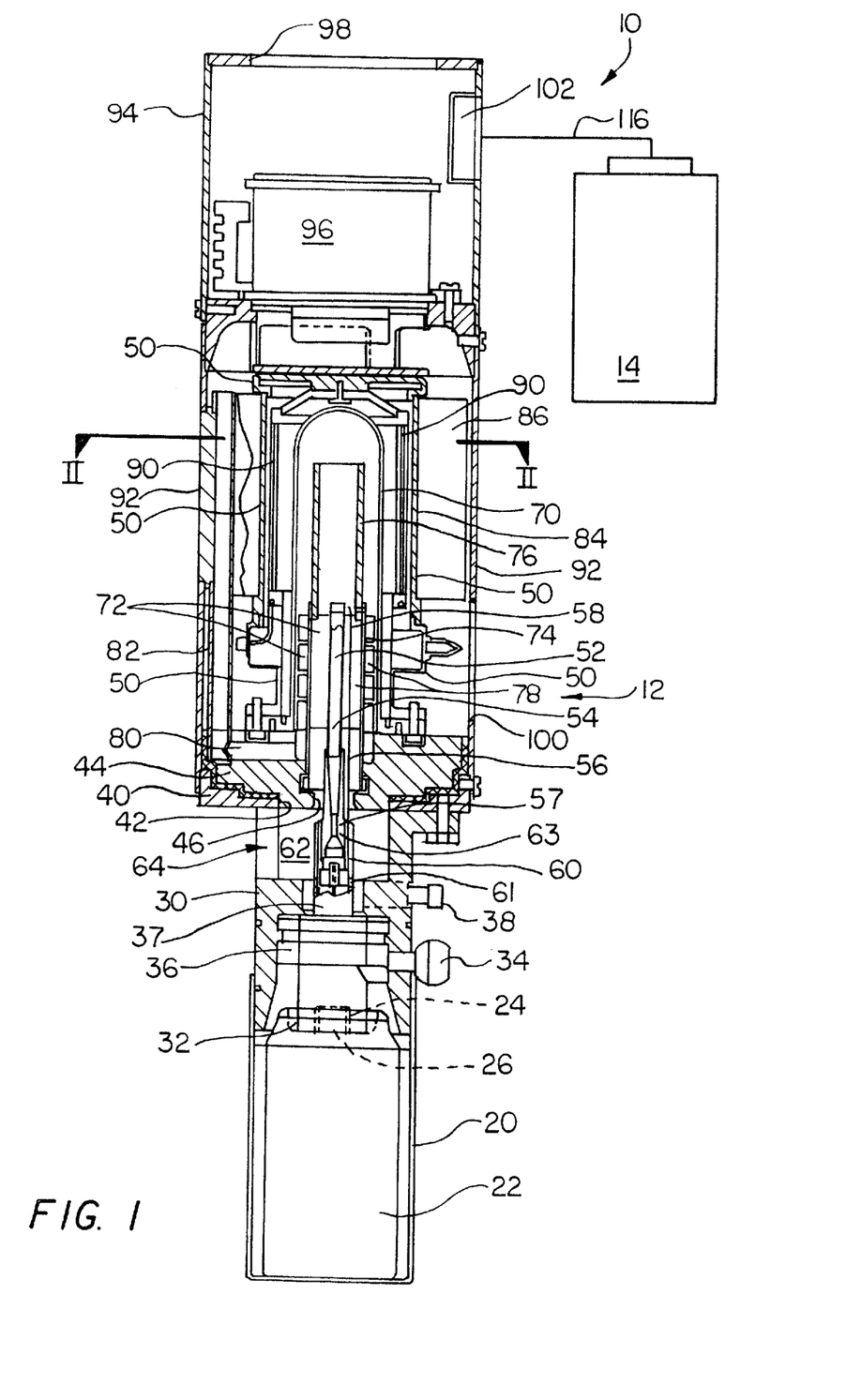
FIG. 1 is a generally centerline sectional, partly diagrammatic view of one form of hybrid power assembly illustrative of an embodiment of the invention.

Referring to FIG. 1, it will be seen that the power source described herein comprises a hybrid power assembly 10 including (1) a thermophotovoltaic (TPV) power conversion module 12 for converting radiant thermal energy to electrical power, and (2) a battery 14, such as the aforementioned rechargeable BB-390A/U battery, which is rechargeable by electrical power generated by the TPV power conversion module 12.

The TPV power conversion module 12 may include a fuel cartridge housing 20 for retaining a fuel cartridge 22, which preferably is a replaceable propane or butane gas fuel cartridge, or, alternatively, may be a liquid fuel cartridge charged with diesel fuel or jet propulsion fuel. The fuel cartridge 22 is provided with a nozzle 24 having external threads 26 thereon. The fuel cartridge housing 20 is removeably secured to a fuel control and igniter assembly 30 in which is disposed a nozzle 32 (FIG. 3) for threaded engagement with the fuel cartridge nozzle 24 (FIG. 1). The fuel control and igniter assembly 30 further includes an on-off fuel valve 34, a pressure regulator 36 having a discharge tube 37, and an igniter 38.

Figure 3:
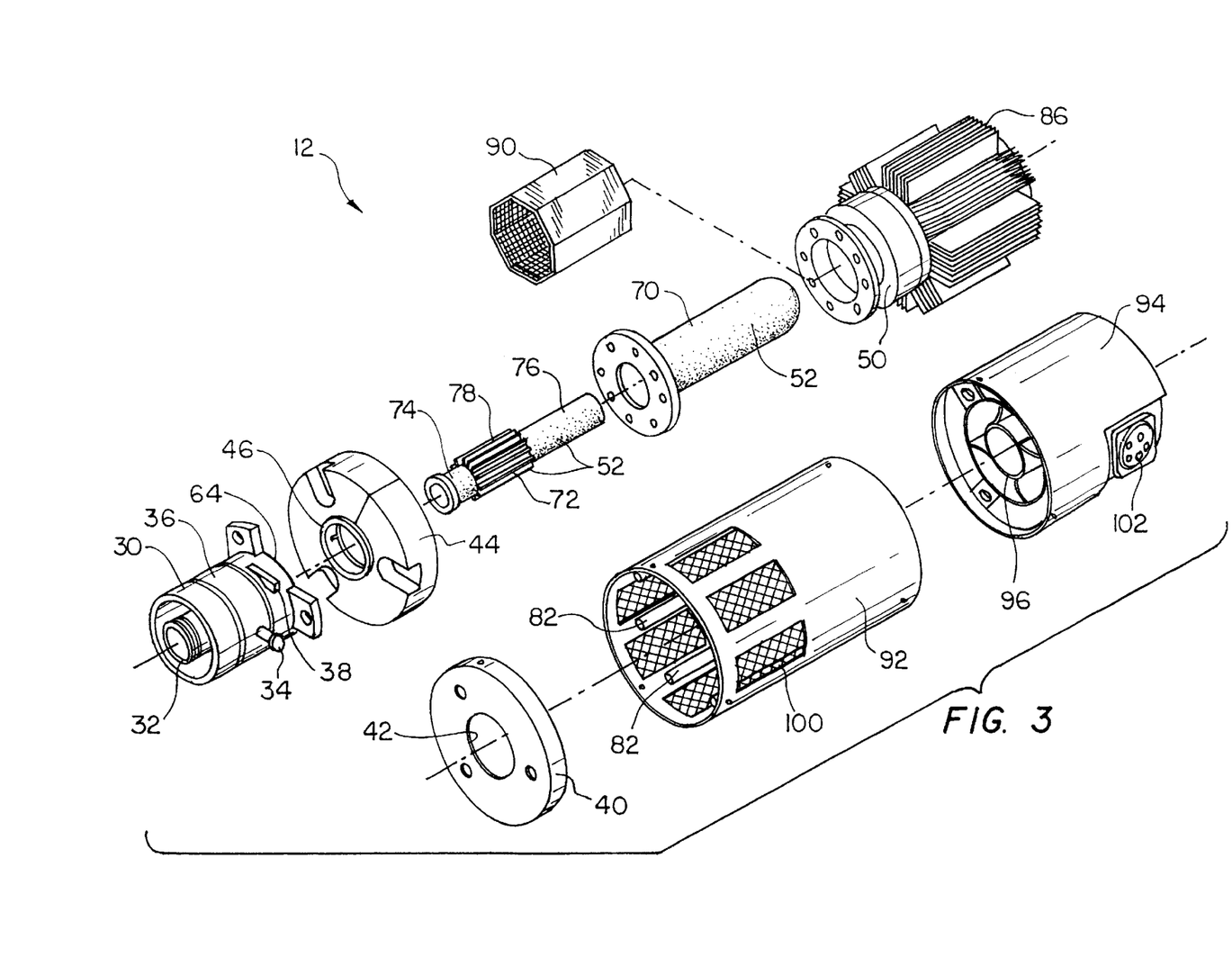
FIG. 3 is an exploded perspective view of portions of a thermophotovoltaic power conversion module portion of the power assembly of FIG. 1.
Figure 4:
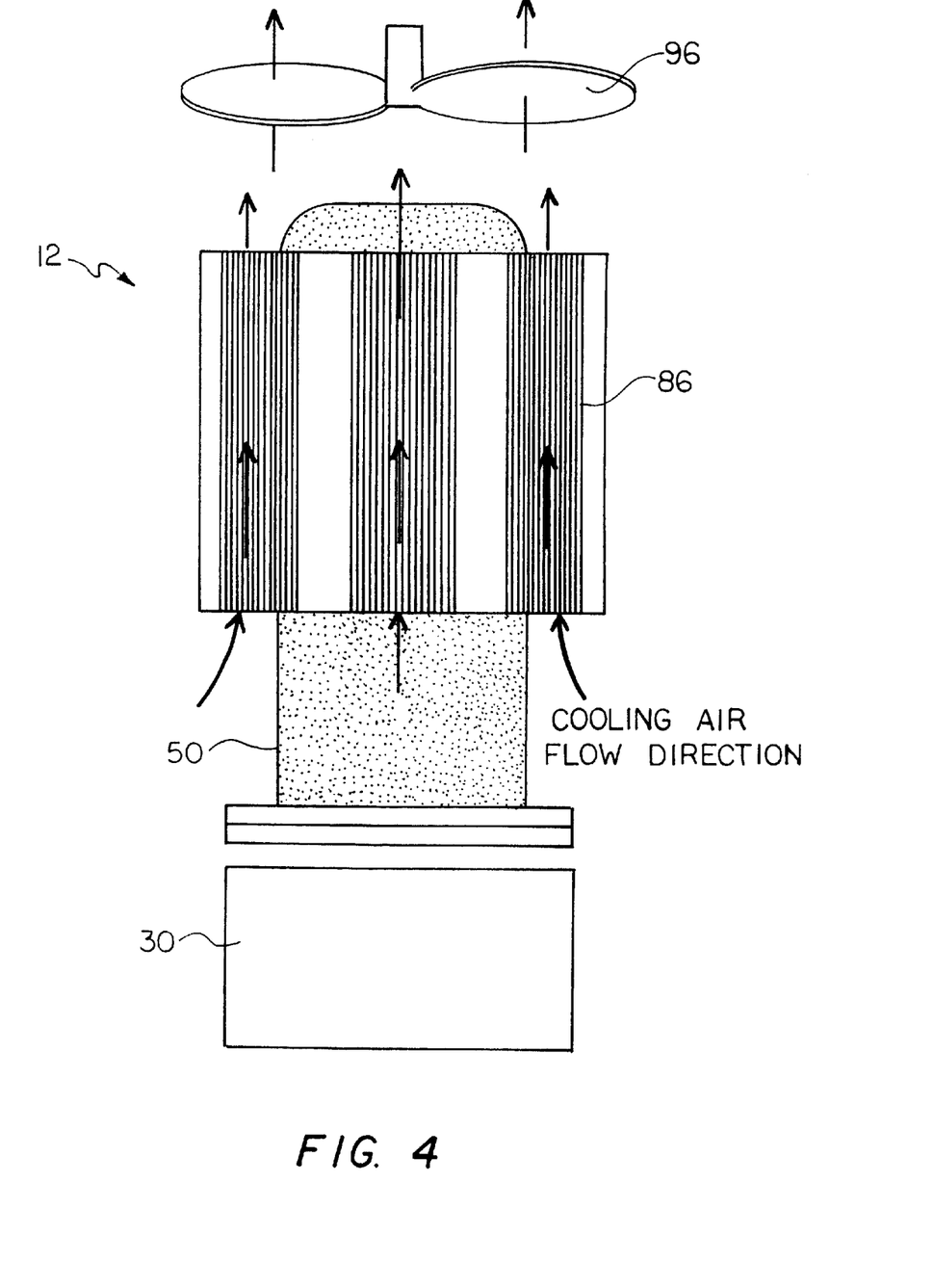
FIG. 4 is a diagrammatic illustration of portions of the assembly of FIG. 3.

The fuel control and igniter assembly 30 is fixed to a base block 40 having a central opening 42. A refractory base member 44 is fixed to the base block 40 and is provided with a central hole 46 concentric with the base block central opening 42.

Mounted on the refractory base member 44 is an enclosure 50 in which is disposed a burner-emitter-recuperator (BER) assembly 52. The assembly 52 includes a burner 54 which extends from the fuel control and igniter assembly discharge tube 37. Adjacent the burner 54 is disposed a support 56 on which are mounted ignition wires 58 extending from the fuel control and igniter assembly 30 and which are in electrical communication with the igniter 38. Upon manual actuation of the igniter 38 a spark is produced at the free ends of the wires 58 to combust fuel flowing through the burner 54. A base end member 57 of the burner 54 is fixed to a shroud 60 having openings 61 therein for flow of air therethrough. In the burner 54 in the area of the shroud 60, the burner base end member 57 is provided with a venturi 63. The flow of pressurized fuel in the burner 54 and through the venturi 63 serves to induct air from an air chamber 62 open to the atmosphere by way of openings 64 in the fuel control and igniter assembly 30. Thus, a mixture of fuel and air flows through the burner 54.

The BER assembly 52 further includes an emitter 70 for radiating thermal energy.

The BER assembly 52 still further includes a recuperator 72 which comprises a recuperator tube 74 mounted in the refractory base member 44 and extending therefrom around the burner 54 and into the emitter 70. A radiator tube 76 is fixed to the recuperator tube 74 and extends within the emitter 70 to proximate a distal end of the emitter. Recuperator fins 78 extend radially inwardly and outwardly from the recuperator tube 74. The recuperator preferably is of a high temperature ceramic material, such as silicon carbide, or a high temperature metal alloy, such as Inconel® (a nickel-chromium alloy including aluminum) or Kanthal® (an iron chromium alloy including aluminum).

Thus, the burner 54 supports a flame within the radiator tube 76 which radiates thermal energy outwardly toward the emitter 70 to heat the emitter. Hot gas in the emitter 70 is pushed by incoming hot gas from the burner 54 towards the outer recuperator fins 78 where heat is transferred by the outer and inner fins 78 to incoming air, prior to ignition thereof. Thereafter, the waste hot air exhausts through channels 80 in the refractory base member 44 to exhaust pipes 82 (FIGS. 1–3) disposed outside the enclosure 50.

The BER assembly 52 uses a single ended coaxial burner/emitter/recuperator configuration. The BER assembly 52 preferably is made of silicon carbide with a tungsten layer as the emitting surface. Convective heat losses are eliminated with the sealed and evacuated enclosure 50 separating the emitter 70 from arrays 90 of TPV cells.

Figure 2:
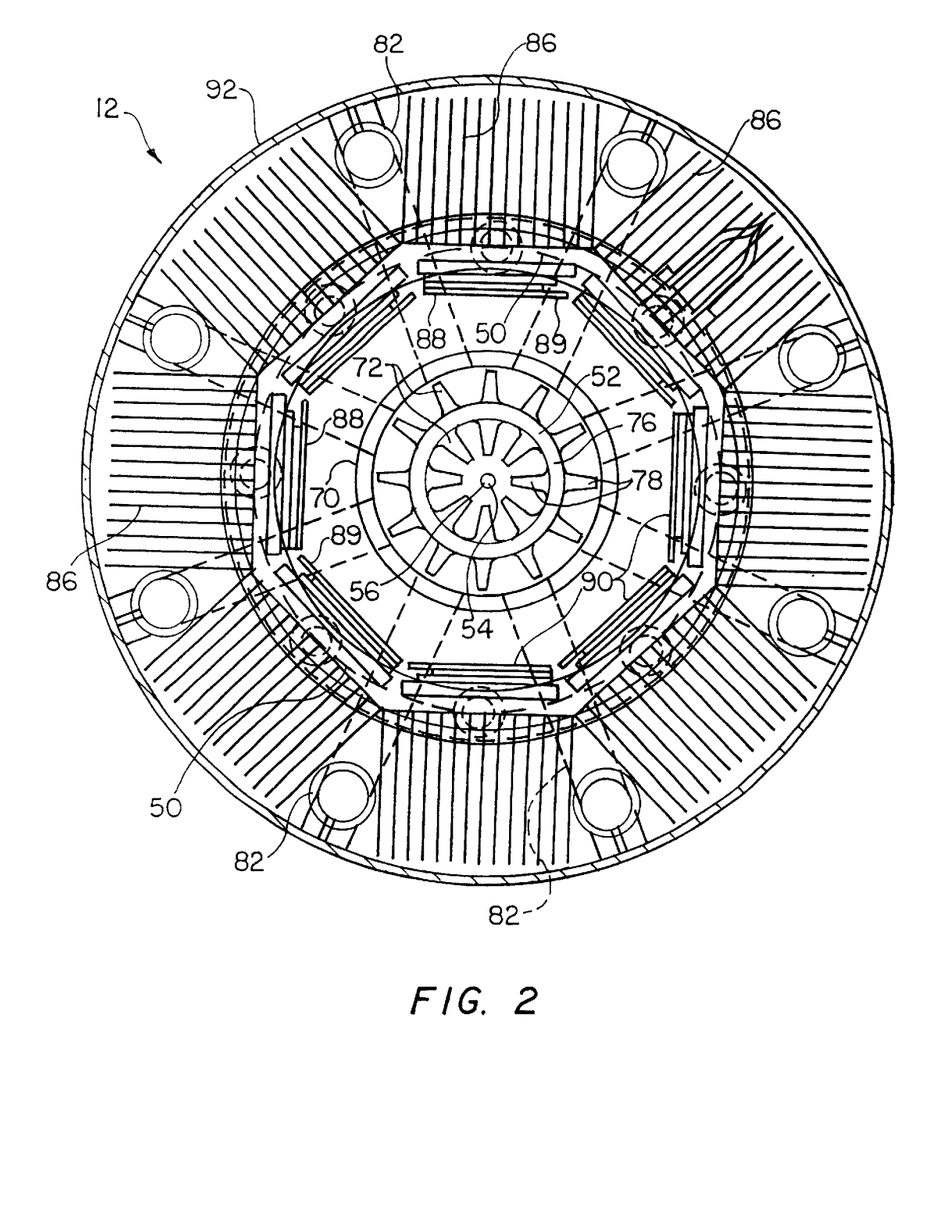
FIG. 2 is a sectional view taken along line II—II of FIG. 1.

Mounted on walls 84 of the enclosure 50 are cooling fins 86. Mounted in the enclosure 50 is the array of photovoltaic cells 90 for converting energy radiated by the emitter 70 to electricity. The TPV cells 90 preferably are of gallium antimonide (GaSb), which, with the tungsten emitter, provides a 30% in-band conversion efficiency. The array preferably includes 40 or more GaSb cells 90, to produce 25 to 40 watts of gross electric power at 12 volts. The TPV cells 90 and cooling fins 86 preferably are configured as an octagon with an axis concentric to the emitter 70 (FIG. 2). The array comprises eight individual circuits with five cells mounted and connected on each circuit. A cover glass 88 with an integral dielectric filter for spectral control, is bonded to each five cell circuit. A gold reflecting surface 89 on one edge of the cover glass 88 reflects the radiant energy falling in spaces between the circuits back to the emitter. The cooling fins 86 preferably are of a high thermal conductivity material, such as copper or aluminum, or alloys thereof.

The BER assembly 52, cooling fins 86, and exhaust pipes 82 are housed within a main cover 92. A fan cover 94 is attached to the main cover 92 and houses a fan and motor 96 which is operative to draw waste hot air from the exhaust pipes 82 and into the fan cover 94 and out of the power assembly 10 by way of an opening 98 in the fan cover 94. Further, the fan is operative to draw air through inlets 100 in the main cover 92 and to flow the incoming atmospheric air through the cooling fins 86 to cool the TPV cells 90. Still further, the fan is operative to draw air in through the openings 64, 46, through the recuperator tube 74 and into the radiator tube 76 for combustion with incoming fuel.

An electrical outlet 102 is mounted in the fan cover 94 and is in electrical communication with the battery 14.

The operation of the above described TPV power conversion module 12 starts with the flow of fuel, stored in the replaceable fuel cartridge 22, through the pressure-regulator 36, to the burner 54. For gaseous fuels, such as propane and butane, which are stored as compressed liquids, the fuel cartridge is under sufficient pressure to facilitate fuel flow through the nozzle 32 without the need for a pressurizing pump. For liquid fuels, such as diesel oil and jet propulsion fuel of the type commonly referred to as JP-8, the cartridge can be charged with freon or carbon dioxide to force the fuel through the system.

Primary air is provided by making use of the pressurized fuel to induct air into the mixing throat of the venturi 63, where primary air and fuel are mixed. The fan 96 draws secondary air through the openings 64 and through the refractory base member central hole 46, and through the recuperator tube 74 to join the fuel and primary air mixture at the distal end of the burner 54 in the radiator tube 76. The primary air controls the thermal decomposition of fuel and, in the case of liquid fuels, also provides the necessary atomization, while the secondary air supports combustion. The volume of secondary air thus greatly exceeds the volume of primary air. The preheated secondary air may, if desired, be supplied under pressure.

At nearly the same time as the fuel valve 34 is opened, a spark from a piezoelectric igniter 38 is used to light-off the burner 54. As combustion takes place, hot gases heat the emitter 70 to a temperature of approximately 2600 degrees Fahrenheit. The resulting infrared radiation is then converted to electric power by the TPV cells 90. For maximizing the fuel-to-electric power efficiency, the recuperator 72 is used to transfer heat energy from the exhaust gases to the incoming combustion air. The recuperator 72 has integral fins 78, or other extended surfaces, to enhance the heat transfer. Accordingly, only cool combustion gas leaves the system.

The radiating emitter 70 and recuperator 72 operate at high temperatures and are subject to thermal stresses. Accordingly, it is necessary that the material of the emitter and recuperator be chemically stable at high temperature. A preferable material is silicon carbide, produced by chemical vapor deposition (CVD) or chemical vapor composite (CVC) technology. Other suitable materials include tungsten, alumina, zirconia, magnesia, etc., all of which can be produced by the CVD/CVC process. The advantage of the CVD/CVC approach is that different materials can be plated over one another, such that complex geometries can be produced in a final configuration without additional processing, and the material can be made vacuum tight. Further, different selected emitter surfaces can be applied, such as ytterbium oxide, erbium oxide, or tungsten.

An important consideration for achieving high overall performance of the system described herein lies in the matching of the radiative energy output of the radiative emitter 70 to that of the TPV cells 90. All semiconductor photoconverters of conventional design convert radiant energy efficiently only over a narrow optical bandwidth. As a result, it is desirable to match the emitter output spectrum to the responsivity of the TPV cells 90 in order to minimize the non-convertible radiation to the emitter 70 and resulting recuperation requirements for high overall system efficiency. A number of emitter/TPV cell combinations can be used. For example, silicon photoconverters are well matched with an ytterbium oxide emitter, while an erbium oxide emitter is well matched with gallium antimonide TPV cells. Also, silicon carbide and tungsten are effective emitters with gallium antimonide.

For high reliability and to minimize heat loss, the emitter 70 and TPV cells 90 are mounted in the sealed enclosure 50, and evacuated or charged with a low heat transfer gas, such as argon. This minimizes undesirable convective/conductive heat transfer between the emitter 70 and cells 90. The vacuum, or inert gas, allows the use of tungsten or carbon as an emitter, or emitter substrate, both of which would normally oxidize in an oxygen environment. Tungsten and carbon have excellent high temperature material characteristics and can be coated with a low emissivity material to minimize off-band radiation to the cells. Because only a portion of the radiative output is at a wavelength compatible with that of the TPV cell, a selective filter is used to re-radiate non-convertible wavelengths back to the emitter. However, because the TPV cells are not 100 percent efficient in converting the radiation to electricity, the cells need to be cooled. This is accomplished with the finned heat sink 86.

For military training or military missions heretofore using rechargeable BB-390A/U batteries, the hybrid power assembly described hereinabove provides a lower weight system if more than one rechargeable battery is required. For military missions heretofore using BA-5590 non-rechargeable batteries, the hybrid power assembly provides a lower weight system if more than three non-rechargeable batteries are needed to perform the mission.

Figure 5:
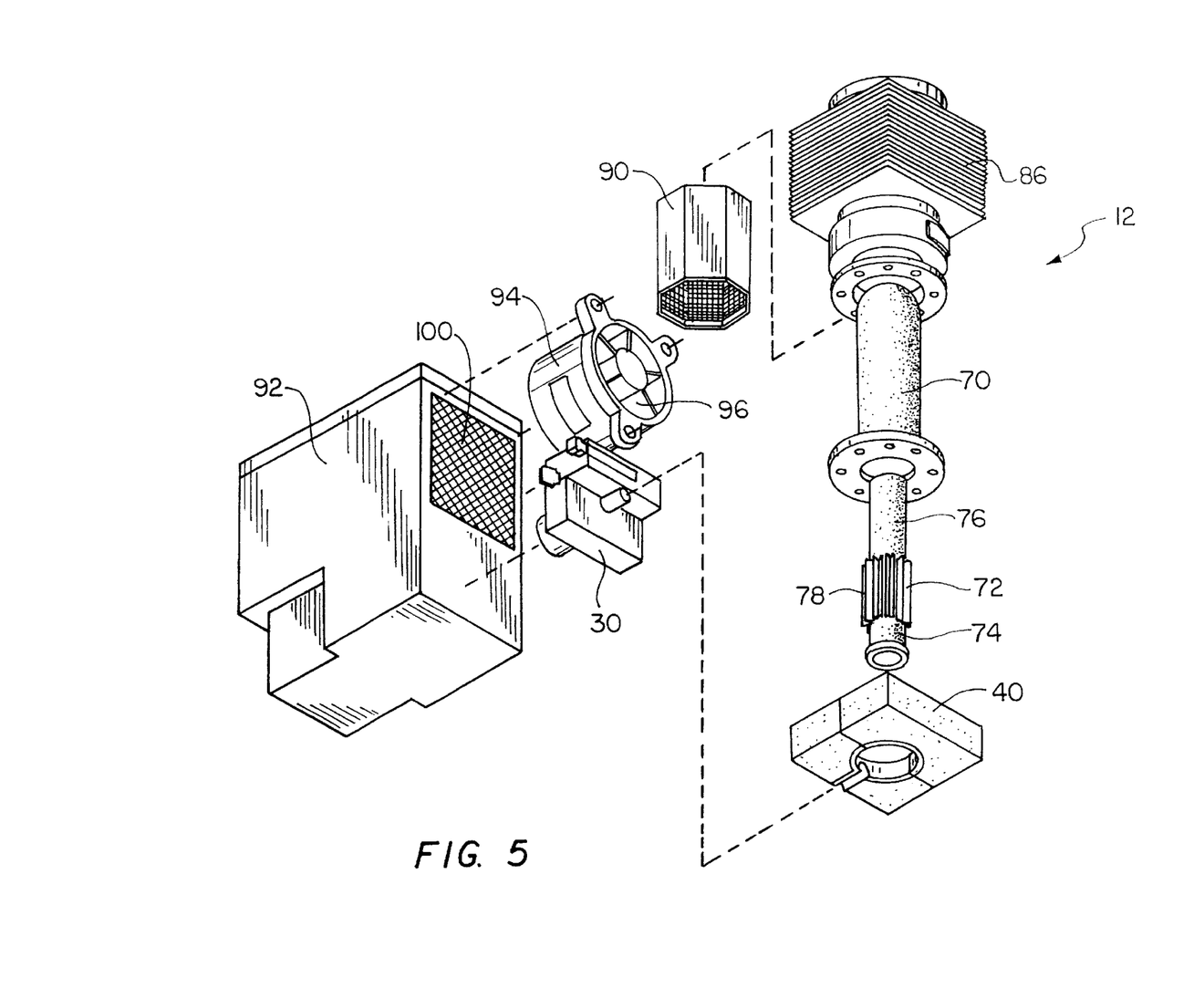
FIG. 5 is an exploded perspective view of an alternative thermophotovoltaic power conversion module portion for the power assembly of FIG. 1.
Figure 6:
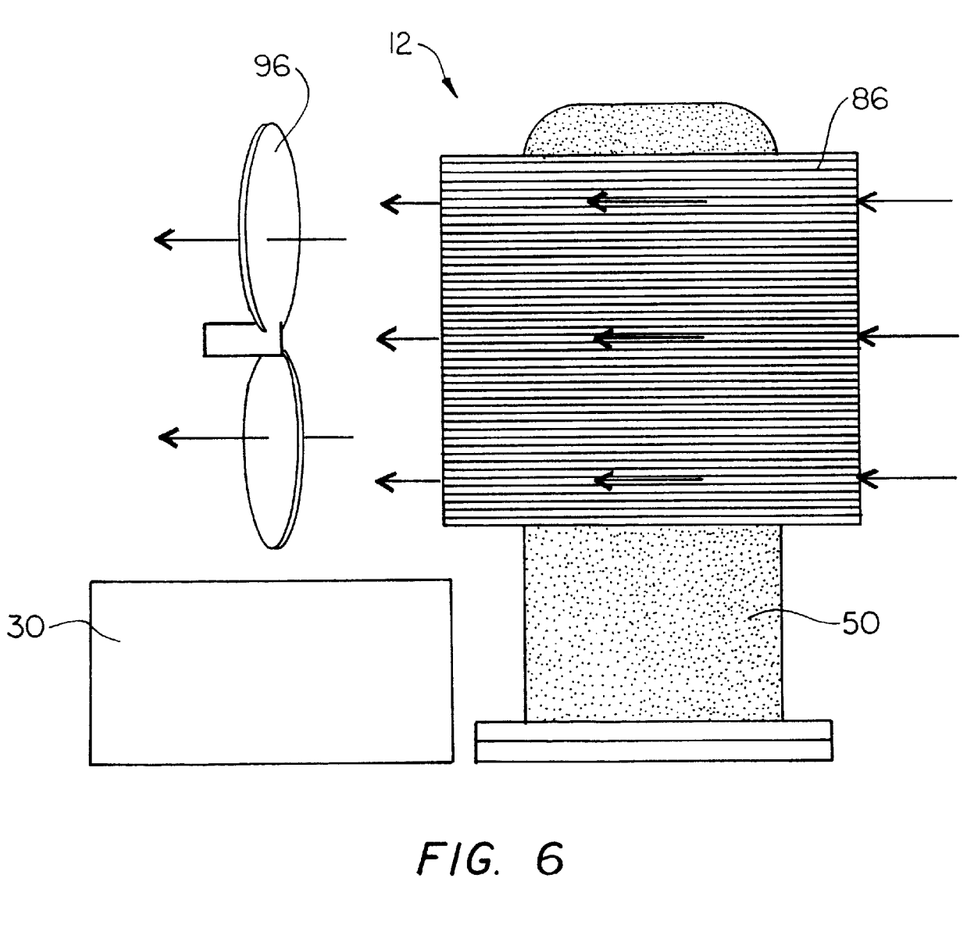
FIG. 6 is a diagrammatic illustration of portions of the assembly of FIG. 5.

Referring to FIGS. 5 and 6, it will be seen that the cooling fins 86 may be mounted normal to the axis of the power conversion module 12, and the fan 96 may be placed alongside the cooling fins to draw air therethrough. The embodiment shown in FIGS. 1–4 is of a cylindrical configuration, while the embodiment shown in FIGS. 5 and 6, is a generally rectangular configuration. Power-consuming devices having a recess for receiving rectangularly shaped batteries can more easily accommodate the rectangularly shaped hybrid unit.

Figure 7:
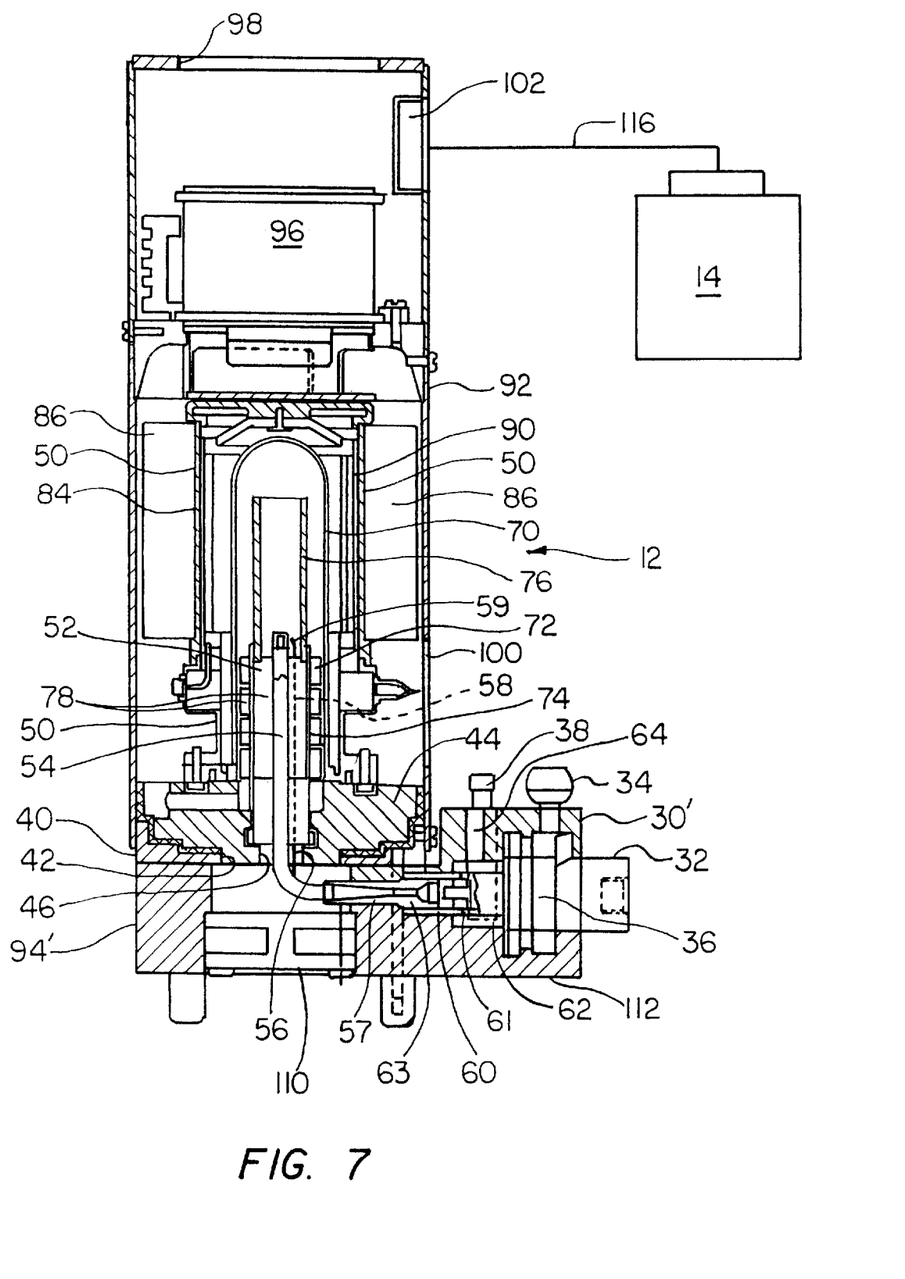
FIG. 7 is similar to FIG. 1, but illustrative of an alternative embodiment.

As noted above, the secondary air, which supports combustion, may be supplied under pressure, rather than relying solely on a draft provided by the fan 96. Referring to FIG. 7, it will be seen that in an alternative embodiment a secondary air fan 110 is mounted on the power conversion module 12 in axial alignment with the base block 40 and the refractory base member 44.

The fan 110 is disposed in a base housing 112 which includes a fan cover portion 94' and a fuel control and igniter assembly portion 30' in which are mounted the fuel valve 34, the igniter 38, and the pressure regulator 36. In the base housing 112, the burner 54 is curved to extend transversely and preferably substantially normally, to the axis of the power conversion module 12. The burner venturi 63 is disposed in the housing 112. The shroud 60 is mounted on the venturi 63 and is provided with the openings 61 in communication with the air chamber 62 which receives air through the opening 64.

In operation of the FIG. 7 embodiment, upon opening of the fuel valve 34, fuel enters the power conversion module 12 through the nozzle 32 and flows through the venturi 63. Fuel flows through the venturi 63 and induces flow of primary air through the opening 64 and into the fuel stream, to mix with the fuel. The primary air controls the thermal decomposition of fuel and, in the case of liquid fuels, also provides the necessary atomization of the fuel. The mixture of fuel and primary air flows through the burner 54. Operation of the igniter 38 produces a spark at a distal end 59 of the ignition wire 58 for starting combustion.

Simultaneously, the fan 110 operates to blow air through the refractory base member central hole 46 and through the recuperator 72 to the distal end of the burner 54 for mixing with the fuel and primary air and to support combustion thereof.

The power conversion module 12 operates substantially as described above relative to the embodiment shown in FIGS. 1 and 2, to provide electrical current for the recharging of the battery 14.

In the embodiment shown in FIG. 7, the fan 96 may be operative to blow cooling air toward the cooling fins 86, the exhaust therefrom exiting the unit by way of the openings 100.

Figure 8:
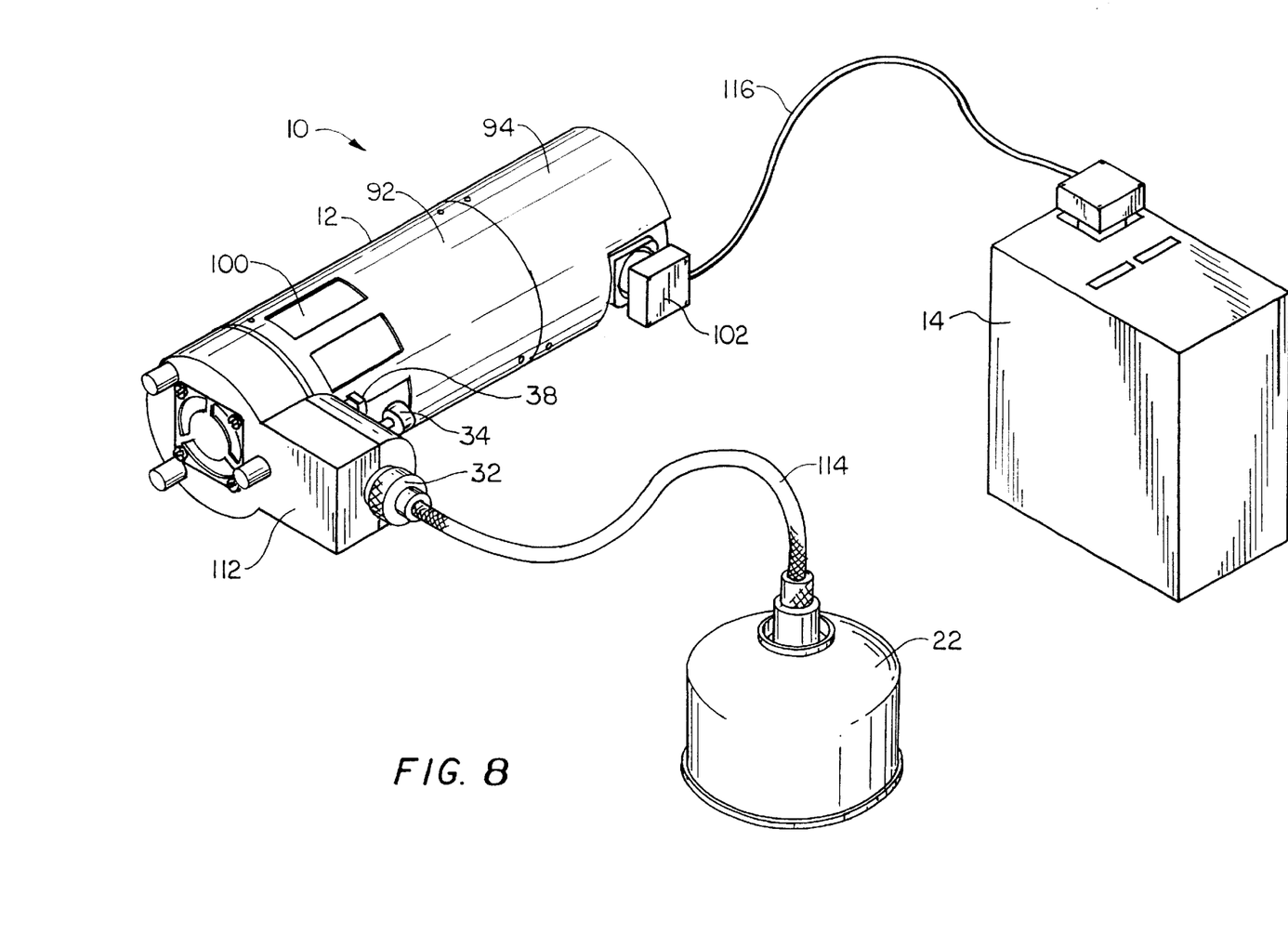
FIG. 8 is a diagrammatic illustration of the assembly of FIG. 7 in combination with other power assembly components.

In FIG. 8, there is shown the embodiment of power conversion module 12 of FIG. 7 in combination with a fuel cartridge spaced from, but in communication with, the module 12 by way of a fuel line 114 external to the module 12. Similarly, in FIG. 8, as in FIGS. 1 and 7, the battery 14 is shown spaced from, but in electrical communication with, the module 12 by way of an electrical transmission line 116. It will be apparent that the battery 14 may be housed with the module 12, as is the fuel cartridge 22 in FIG. 1, or may be discrete from the module 12, as shown in FIGS. 7 and 8; and that the fuel cartridge 22 may be disposed in a common housing with the power module 12 (FIG. 1) or may be discrete from the module 12 (FIG. 8).

There is thus provided a hybrid TPV-battery system which is comprised of a 25 to 40 watt (gross) TPV power source used in combination with a BB-390A/U rechargeable battery. It includes a replaceable propane fuel cartridge to provide an immediate recharging capability. This combination of a TPV power source with a rechargeable battery has the capability to provide both high instantaneous power and high stored energy and to substitute for BA-5590 and BB-390A/U batteries in many military missions. There is further provided a system which can be operated in any orientation and which is relatively unaffected by contaminants in the air.

It is to be understood that the present invention is by no means limited to the particular construction herein disclosed and/or shown in the drawings, but also comprises any modification or equivalent within the scope of the claims.

What is claimed is:

1. A hybrid power assembly comprising:
   a thermophotovoltaic (TPV) power conversion module for converting radiant thermal energy to electrical power; said power conversion module comprising:
      a burner-emitter-recuperator (BER) assembly comprising a burner for supporting a flame, an emitter around said burner for transmitting thermal energy, and a recuperator for transferring waste thermal energy to incoming air and fuel, said BER assembly being disposed in a hermetically sealed enclosure;
      an array of photovoltaic (PV) cells disposed around said emitter and within said enclosure;
      an air-cooled heat sink disposed around said enclosure; and
   a battery in electrical communication with said TPV power source and rechargeable by electrical power generated by said TPV power conversion module.

2. The power assembly in accordance with claim 1 wherein said emitter is of tungsten.

3. The power assembly in accordance with claim 2 wherein said array of PV cells is of gallium antimonide, GaSb.

4. The power assembly in accordance with claim 1 wherein said recuperator is of a material selected from the group of materials consisting of a high temperature ceramic material and a high temperature metal alloy.

5. The power assembly in accordance with claim 4 wherein said ceramic material comprises silicon carbide.

6. The power assembly in accordance with claim 4 wherein said metal alloy comprises an alloy selected from the group of alloys consisting of a nickel-chromium alloy including aluminum and an iron-chromium alloy including aluminum.

7. The power assembly in accordance with claim 1 wherein said power assembly further comprises a replaceable fuel cartridge adapted for communication with said burner.

8. The power assembly in accordance with claim 1 wherein said assembly further comprises an optical filter disposed in said enclosure.

9. The power assembly in accordance with claim 1 wherein said enclosure is charged with inert gas.

10. The power assembly in accordance with claim 7 wherein said fuel cartridge is pressurized and said burner is adapted to mix fuel from said fuel cartridge with air prior to combustion thereof.

11. The power assembly in accordance with claim 1 wherein said BER assembly is of silicon carbide and said emitter comprises a silicon carbide tube with a layer of tungsten thereon and constituting an emitting surface.

12. The power assembly in accordance with claim 3 wherein said array of PV cells comprises at least forty GaSb cells to provide about 25 to 40 watts of electric power at about 12 volts.

13. The power assembly in accordance with claim 12 wherein said array of PV cells and said heat sink are of an octagon configuration with an axis concentric with an axis of said emitter.

14. The power assembly in accordance with claim 13 wherein said array of PV cells comprises eight circuits, with each of said circuits having five of said cells, and the power assembly further comprises a cover glass bonded to each of said circuits, said cover glass being provided with an integral dielectric filter for spectral control.

15. The power assembly in accordance with claim 1 wherein said heat sink comprises cooling fins and wherein said power assembly further comprises a fan for moving air through said cooling fins.

16. The power assembly in accordance with claim 15 wherein said fins extend substantially normal to a lengthwise axis of said power conversion module, and said fan is mounted alongside said power conversion module to move air in directions substantially normal to said lengthwise axis of said power conversion module.

17. The power assembly in accordance with claim 15 wherein said fins extend substantially parallel to a lengthwise axis of said power conversion module, and said fan is mounted axially of said module to move air in a direction substantially parallel to said lengthwise axis of said power conversion module.

18. The power assembly in accordance with claim 15 wherein said cooling fins are of a high thermal conductivity material.

19. The power assembly in accordance with claim 18 wherein said high thermal conductivity material comprises a material selected from the group of materials consisting of copper, aluminum, copper alloys, and aluminum alloys.

20. The power assembly in accordance with claim 7 wherein said cartridge is charged with a gas selected from the group of gases consisting of propane gas and butane gas.

21. The power assembly in accordance with claim 7 wherein said cartridge is charged with a liquid fuel selected from the group of liquid fuels consisting of diesel fuel and jet propulsion fuel.

22. The power assembly in accordance with claim 14 wherein each of the cover glasses is provided with a reflecting surface adjacent one edge of the cover glass, for reflecting radiant energy directed to spaces between said circuits back to said emitter.

23. The power assembly in accordance with claim 22 wherein the reflecting surfaces are of gold.

24. The power assembly in accordance with claim 1, wherein said enclosure is evacuated.

25. A hybrid power assembly comprising:
   a thermophotovoltaic (TPV) power conversion module for convertion thermal energy to electrical energy, said module comprising:
      a fuel inlet for admitting fuel to said module comprising:
         a burner in communication with said fuel inlet;
         a venturi disposed in said burner, said venturi having openings therein in communication with an air chamber, flow of fuel through said venturi inducing flow of primary air from the air chamber, through the openings, and into said burner to mix with the fuel therein;
      wherein the air chamber is in communication with a distal end of said burner, and wherein secondary air in the air chamber is flowed to said distal end of said burner to mix with the mix of fuel and primary air exiting said burner distal end to combust therewith and produce thermal energy;

means for converting the thermal energy to electrical energy; and a battery in communication with said means and adapted to be recharged by the electrical energy produced therby.

26. The power assembly in accordance with claim 25 wherein the fuel is a gaseous fuel and the flow of the primary air into said burner to mix with the fuel therein serves to control thermal decomposition of the fuel.

27. The power assembly in accordance with claim 25 wherein the fuel is a liquid fuel and the flow of the primary air into said burner to mix with the fuel therein serves to control thermal decomposition of the fuel and to atomize the fuel.

28. The power assembly in accordance with claim 25 wherein said assembly further comprises a recuperator tube disposed substantially concentrically around said burner to provide a substantially annular flow path for the secondary air from the air chamber to said distal end of said burner, inner fins mounted on said recuperator tube and extending inwardly therefrom, and outer fins mounted on said recuperator tube and extending outwardly therefrom, said outer fins being disposed in an exit path for hot waste gas from the combustion, said fins being operative to transfer heat from the waste gas to the secondary air in said flow path for secondary air.

29. The power assembly in accordance with claim 28 wherein said assembly further comprises a fan for drawing the waste gas from said recuperator and for drawing the secondary air from the air chamber and into said recuperator.

30. The power assembly in accordance with claim 25 wherein said fuel inlet is adapted for connection to a fuel cartridge, said fuel cartridge being disposed in a fuel cartridge housing portion of said TPV module.

31. The power assembly in accordance with claim 25 wherein said fuel inlet is adapted for connection to a fuel cartridge spaced from said TPV module.

32. The power assembly in accordance with claim 25 wherein said battery is disposed in a housing with said TPV module.

33. The power assembly in accordance with claim 25 wherein said battery is spaced from said TPV module and in electrical communication therewith.

34. A hybrid power assembly comprising:

a thermophotovoltaic (TPV) power conversion module for converting thermal energy to electrical energy, said module comprising:

a fuel inlet for admitting fuel to said module;

a burner in communication with said fuel inlet;

a venturi disposed in said burner, said venturi having openings therein in communication with an air chamber, flow of fuel through said venturi inducing flow of primary air from the air chamber, through the openings, and into the burner to mix with the fuel therein;

a secondary air fan in communication with a secondary air source and with a distal end of said burner, and adapted to move secondary air from the secondary air source to the distal end of said burner to mix with the mix of fuel and primary air exiting the burner distal end to combust therewith and produce thermal energy;

means for converting the thermal energy to electrical energy; and a battery in communication with said means and adapted to be recharged by the electrical energy produced thereby.

35. The power assembly in accordance with claim 34 wherein the fuel is a gaseous fuel and the flow of the primary air into said burner to mix with the fuel therein serves to control thermal decomposition of the fuel.

36. The power assembly in accordance with claim 34 wherein the fuel is a liquid fuel and the flow of the primary air into said burner to mix with the fuel therein serves to control thermal decomposition of the fuel and to atomize the fuel.

37. The power assembly in accordance with claim 34 wherein said assembly further comprises a recuperator tube disposed substantially concentrically around said burner to provide a substantially annular flow path for the secondary air from the air chamber to said distal end of said burner, inner fins mounted on said recuperator tube and extending inwardly therefrom, and outer fins mounted on said recuperator tube and extending outwardly therefrom, said outer fins being disposed in an exit path for hot waste gas from the combustion, said fins being operative to transfer heat from the waste gas to the secondary air in said flow path for secondary air.

38. The power assembly in accordance with claim 37 wherein said assembly further comprises a cooling fan for blowing the waste gas in said TPV module out openings in a main cover of said TPV module.

39. The power assembly in accordance with claim 34 wherein said fuel inlet is adapted for connection to a fuel cartridge, said fuel cartridge being disposed in a fuel cartridge housing portion of said TPV module.

40. The power assembly in accordance with claim 34 wherein said fuel inlet is adapted for connection to a fuel cartridge spaced from said TPV module.

41. The power assembly in accordance with claim 34 wherein said battery is disposed in a housing with said TPV module.

42. The power assembly in accordance with claim 34 wherein said battery is spaced from said TPV module and in electrical communication therewith.

* * * * *